United States Patent [19]

Goodman

[11] 4,225,880

[45] Sep. 30, 1980

[54] ENERGY-EFFICIENT BEAM-INDEX DISPLAYS WITH PROGRAMMABLE POWER SUPPLIES

[76] Inventor: David M. Goodman, 952 Santa Queta, Solana Beach, Calif. 92075

[21] Appl. No.: 961,280

[22] Filed: Nov. 16, 1978

[51] Int. Cl.² .................................................. H04N 9/22
[52] U.S. Cl. ........................................ 358/66; 313/470; 313/471; 315/369; 315/370; 358/67; 358/74; 358/190
[58] Field of Search .................... 358/66, 67, 69, 70, 358/190, 74; 315/369, 371, 31 TV, 12 ND; 313/470, 471, 472

[56] References Cited

U.S. PATENT DOCUMENTS

| | | | |
|---|---|---|---|
| 2,802,964 | 8/1957 | Jesty | 313/92 |
| 3,271,610 | 9/1966 | Law | 313/92 |
| 4,163,250 | 7/1979 | Tomii et al. | 358/45 |

*Primary Examiner*—Robert L. Richardson
*Attorney, Agent, or Firm*—O'Brien & Marks

[57] ABSTRACT

Programmable power supplies are made responsive to beam-index and timing signals in order to automatically control the size and position of the display on a cathode ray tube. The high voltage power supply is also made programmable, responsive to video signal content, to reduce the energy stored in the high voltage circuits. Savings in energy consumption are also obtained by efficiently modulating the target screen of a beam-index type color cathode ray tube. Energy lost at the target screen is less than 10% compared to approximately 70% for a conventional color tube, an improvement factor of 7.1 or more.

24 Claims, 7 Drawing Figures

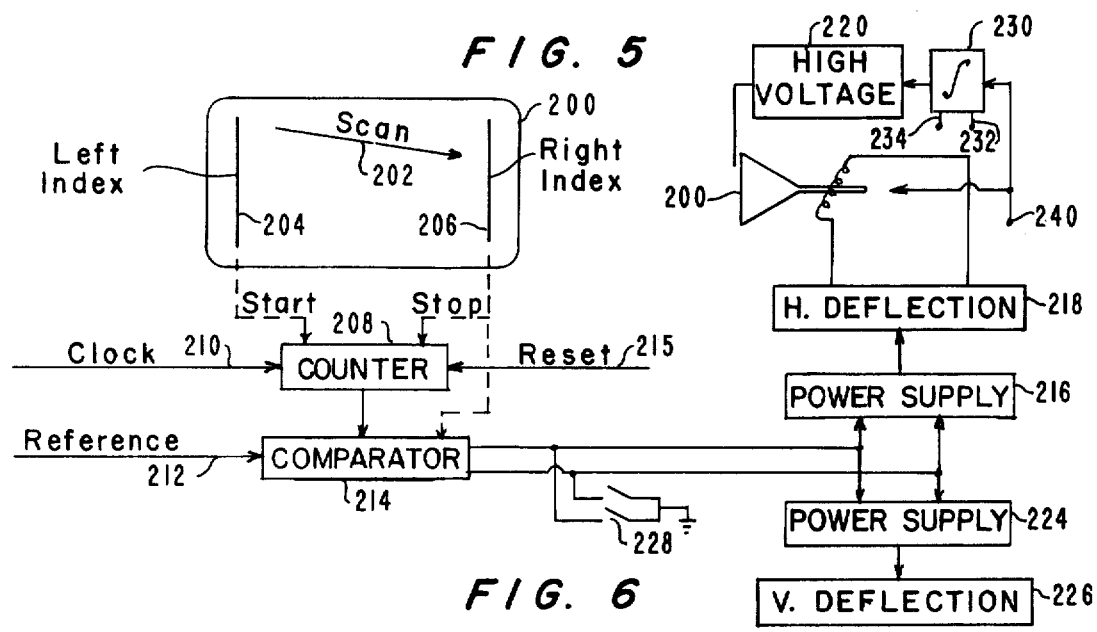

ENERGY-EFFICIENT BEAM-INDEX DISPLAYS WITH PROGRAMMABLE POWER SUPPLIES

BACKGROUND OF THE INVENTION

It is known to use electron beams and light beams to excite a target screen as one step in developing a viewable picture, either monochrome or color. For color rendition, by far the most popular form of display device is the so-called "shadow-mask" cathode ray tube. It is also known, however, that there is another more efficient way to control the generation of a color picture; by synchronizing the excitation of the target screen via index signals which provide information as to the location of the electron beam or light beam as set forth for example in U.S. Pat. No. 3,967,315.

Another category of display devices exists which develops high resolution viewable images in color, the so-called penetration cathode ray tube. The voltage at the target screen in these penetration tubes is switched over the range from 6–18 kilovolts to change the color of the image being generated.

Also, very high resolution kinescopes in monochrome are used to present alpha-numeric or graphic type data. The performance of these kinescopes is reaching the stage where the quality of the image developed approaches that of the printed page with four point type.

In all the above types of display devices there are problems having to do with the power supplies required for their operation. For example, to operate the "shadow-mask" tube a high voltage supply typically furnishes 25–30 kilovolts with an average current of approximately 1 milliampere. Two serious problems are associated with power supplies capable of providing such power. First, there is the matter of health and safety for the operator or the maintenance technician. The voltages and power involved are lethal. Second, there is the matter of display system malfunction which can be brought about by high voltage arcing between elements of the kinescope. Various froms of arc suppression are in use but each has its limitations. Furthermore some sensitive circuits can be destroyed even when high voltage arcs are shunted to ground the protect the tube.

In the penetration type kinescope, it is possible to achieve very high resolution in any single color because of the homogenous construction of the different color producing phosphor layers. However, to achieve correct registration of the image from one color to the next presents a serious problem because the deflection sensitivity of the display system has to track large changes in high voltage to a very high degree of precision.

In the high resolution monochrome kinescope a similar registration problem arises because as the resolution gets better and better the requirement to control the exact position of the electron beam continues to increase.

In the beam-index color tube, the problem is the least severe but the stability and energy storage of the power supplies still are matters of concern.

For the above reasons, the cost and energy utilization of power supplies in modern high resolution and color display devices are becoming leading factors in the overall performance and selling price of the complete display system.

SUMMARY OF THE INVENTION

The display systems described herein make use of programmable power supplies which are automatically adjusted, in response to beam-index signals, to control picture size and position. The high voltage power supply also is programmed to reduce its capacity to deliver energy. The invention is described for NTSC television (525 line raster scan) beam-index displays, either direct view or projection; electron beam or light beam scanned. It is clearly applicable to the other display systems when the beam-indexing features are added thereto.

The control of picture size is achieved by measuring the time it takes for the scanning beam to traverse the target screen, comparing this measured time with a reference time, and then adjusting the deflection power to bring the measured time into agreement with the reference time. The measurement is started by a first index signal and is stopped by a second index signal. These two index signals are derived from the target screen in a novel application of the classic beam-index principle.

The control of picture position on the target screen is achieved by measuring the time interval between the deflection synchronizing (or flyback) pulses and first index signals, and then adjusting this time interval to a known value by shifting the picture left or right, or up or down.

The reduction of stored energy is made possible by controlling the magnitude of the high voltage as a function of the video drive integrated over a television field or frame.

Two other important features are disclosed which have to do with increasing the efficiency of energy utilization at the target screen. Thus, means are described which increase the luminance component in an NTSC type signal when a pure blue field is being received to insure that adequate beam current will be available in the CRT for indexing purposes. This decreases slightly the saturation of the blue field, which is deemed acceptable. Also with respect to the blue field, the target screen is made to have the blue-emitting phosphor strips more narrow than the other color-emitting strips to reduce the apparent (subjective) vertical line structure of the viewed image.

BRIEF DESCRIPTION OF THE DRAWING

FIG. 5 is a block diagram which illustrates how the width of the picture is changed by controlling the duration of the horizontal scan from a first index strip to a second index strip.

FIG. 6 is a block diagram which illustrates how the horizontal position of the picture is changed by controlling the duration of the horizontal scan from a selected portion of the retrace cycle to a first index strip.

FIG. 7 is a block diagram which illustrates how the height of the picture is changed by controlling the duration of the vertical raster scan as measured from the top index signals to the bottom index signals.

DESCRIPTION OF THE PREFERRED EMBODIMENT

Figure 1:
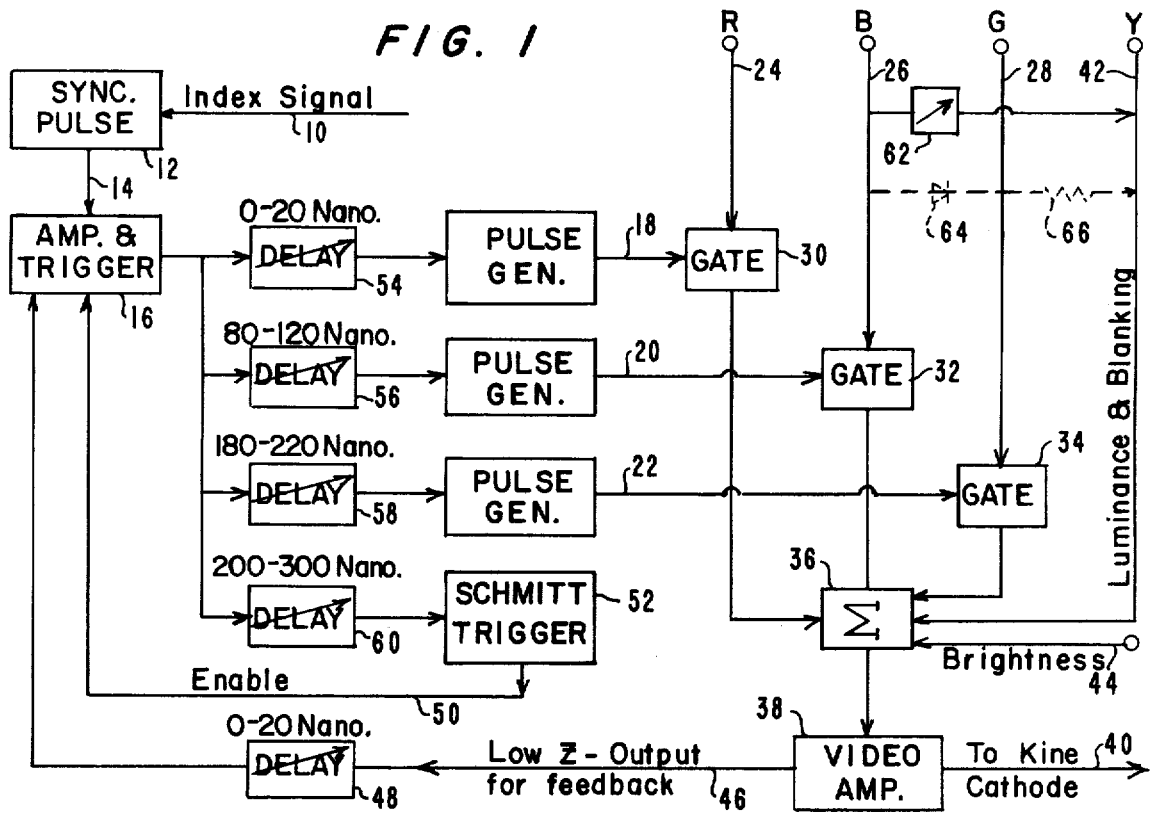
FIG. 1 is a block diagram of color video sampling and timing circuits, responsive to index signals, which modulate the scanning electron beam in a raster-scan beam-index type of cathode ray tube display.
Figure 2:
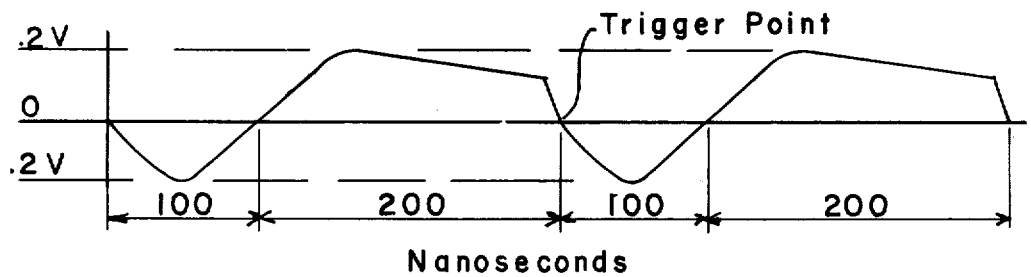
FIG. 2 is a timing diagram (for a 5 inch diagonal picture tube) which depicts an input index signal from which a master synchronizing pulse is derived.
Figure 3:
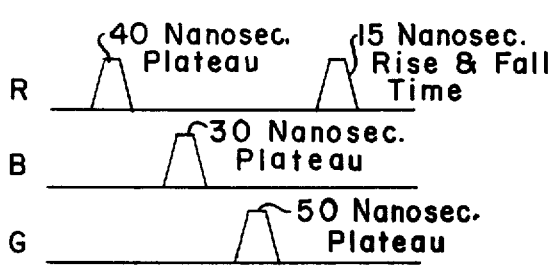
FIG. 3 is a timing diagram which depicts the preferred sequence of the sampling pulses which generate the red, blue, and green modulating pulses.

The invention is described with reference to a beam-index color CRT display system because this type of display is more energy efficient than either the shadow-mask or penetration kinescope; and because some of the desired index signal features already form an integral part of the beam-index device. Accordingly, background information on a typical raster-scan beam-index display responsive to NTSC signals is illustrated in FIG. 1. Primary input index signal 10 is fed into sync pulse generator 12 to start events. Index signal 10 can be electrical or optical. Means for generating this index signal are described in U.S. Pat. Nos. 3,564,121 and 3,826,867 by way of example. One index signal that has been used successfully to synchronize NTSC color signals is depicted in FIG. 2. The negative-going zero-crossing of that index signal is used as a trigger point from which a master sync pulse 14 is derived. From amplifier/trigger 16 three sampling pulses 18, 20, 22 having waveshapes approximately as shown in FIG. 3 are derived and are used to sample the red, blue, and green video signals 24, 26, 28 via gate means 30, 32, 34. The outputs from gates 30, 32, 34 are summed in junction 36 and then through video amplifier 38 are transmitted to modulate the scanning electron beam. It is preferred (but not essential) that the scanning electron beam be modulated via the cathode element in the kinescope as shown at 40 in FIG. 1, and at 240 in FIG. 5.

Also shown feeding into summing junction 36 is the incoming luminance signal 42 containing vertical and horizontal blanking signals, and the brightness control signal 44. Two outputs from video amplifier 38 are shown. One output 40 is for modulating the kinescope as stated. The other output 46 is fed back, via suitable delay 48, to help stabilize the trigger point of amplifier/trigger 16. A second feedback signal 50 enables amplifier/trigger 16 so that it can only be triggered during a selected time interval, set by Schmitt Trigger 52. Delay elements 48, 54, 56, 58 and 60 are shown as adjustable but can be fixed (or selectable) for any given design. Satisfactory pictures have been obtained on a 5 inch diagonal direct view CRT with R,B, and G signals and also with color difference signals R-Y, B-Y, and G-Y at inputs 24, 26, 28. Several improvements in the foregoing arrangement are possible which are now described.

In FIG. 5, the width and the height of the pictures developed on target screen 200 are automatically controlled. The electron beam traverses the target screen in a conventional raster scan 202. Near the left margin of the target screen is index strip 204. Near the right margin is index strip 206. When the scanning beam strikes strip 204 an index pulse is generated and detected which starts counter 208. When the beam strikes strip 206 an index pulse stops counter 208. During this interval, the counter 208 counts clock pulses which arrive continuously at 210. By way of example, clock input 210 is set at 20 megaHertz, derived from a crystal oscillator not shown. If the effective horizontal raster scanning interval is rounded off to 50 microseconds, then 1000 clock pulses are received between the start and stop pulses when the horizontal scan is set properly. Accordingly, the reference input count 212 is set at 1000. When the stop pulse is received from 206 it also enables comparator 214. If the count is exactly 1000, there is no change in the output from comparator 214. Hence, power supply 216 continues to supply the same drive to horizontal deflection means 218. But, if the horizontal sweep is slow and it takes an extra microsecond for the beam to travel from 204 to 206 then it follows that 20 additional clock pulses will be counted. When comparator 214 is enabled the count will be high by 20 additional clock pulses. This results in a signal to power sypply 216 to increase the drive to horizontal deflection means 218. This speeds up the sweep, as is desired. Conversely, if the sweep is too fast not enough clock pulses will be counted and the comparator 214 will indicate a low count. This results in a signal to power supply 216 to decrease the horizontal sweep speed. Counter 208 is reset at 215 by a signal derived from the horizontal flyback pulse. Power supply 216 can be made to respond to a single count, high or low, and so the sweep width can be controlled to one part in one thousand which is more than adequate to meet the requirements for home entertainment viewing of a television receiver, and which is adequate for many precision industrial applications.

Automatic vertical size control is achieved by having the output of power supply 224 respond to the same control as power supply 216. This arrangement is based upon the assumption that whatever change is needed in horizontal deflection power is also needed in vertical deflection power. This assumption is predicated on the fact that the target screen voltage governs deflection sensitivity, and that it equally affects vertical and horizontal deflection. Hence, power supply 224 controls the magnitude of the vertical deflection, provided by 226, and is responsive to the same signals that cause the output of power supply 216 to change.

Manually operated switches 228 are used for initial set-up. The switches are closed to interrupt the output of comparator 214. The deflection yoke is positioned, all voltages set at nominal, and the system is aligned. Switches 228 are then opened to enable the automatic size correction features to become operative.

As just stated, the size of the picture is controlled by the high voltage applied to the target screen 200 and by the magnitude of the currents in the deflection yoke. For this reason, absent this invention, when it is desired to keep the picture size constant the practice has been to regulate the high voltage to keep it between upper and lower limits. While this practice is effective, it also means that contact by a person with the high voltage will induce a shock which will be greater than if the supply were not regulated. This is a most undesirable safety hazard which prompts much caution and warning to the customer. It is also well known that spontaneous high voltage arcs will occur between elements of the kinescope that can do much damage. It has been reported that the short circuit current carried by these arcs can be as high as 400 amperes in a typical television receiver operating at 40 kilovolts. Spark gaps are in common use to protect the kinescope, and the circuits in the vicinity thereof, but they are not always effective. As a consequence other forms of limiting these surge currents have also been used.

In this invention, because the picture size is automatically held constant by controlling the deflection power, it becomes practical to permit the high voltage to fluctuate over wider limits than heretofore. Accordingly, the high voltage power supplies can have higher impedances and less energy storage than is customary; thereby reducing the danger to personnel, reducing the damage that may be caused by arcs, and reducing the cost of the supply itself. Thus, in FIG. 5, high voltage power supply 220 is used to energize target screen 200. The high voltage of supply 220 can be derived from the horizontal flyback pulse, as is customary in entertainment type television receivers, or can be provided from a self-contained unit as is customary to meet the requirements of color beam penetration tubes. In any case, in accordance with this invention the impedance of the high voltage power supply is increased to the extent that a full picture (or a display packed densely with alpha-numerics) draws large enough currents to cause the target screen to measureably drop in voltage. The impedance can be increased by using a voltage multiplier with capacitors of smaller size than is customary. Also, the capacitance from the anode button to ground on the CRT, typically 1900 pF for a 19 inch tube, can be reduced. To prevent loss of brightness or color shift, a feed-forward feature is incorporated at 230 and 240 of FIG. 5 to compensate for the drop in voltage. The cathode drive signal, derived at 40 in FIG. 1, is fed to the kinescope to modulate the electron beam. It is also fed to integrator 230 where it is integrated on a field to field or frame to frame basis, or for several frames. When the integrated value of the cathode drive increases above a reference value a signal is developed which programs an increase in the output of 220, thereby to compensate for the voltage drop brought about by the increased current at target screen 200. Conversely, when the integrated value shows a decrease at the end of a given integration time then a signal is developed which programs a reduction in the high voltage output. Integrator 230 can be analog or digital. Analog integration is preferred when scenic pictures are displayed. Digital integration is preferred when alpha-numerics are displayed. Typically, the integration starts with the trailing edge of a vertical flyback pulse at 232 when a new field or frame starts and ends with the leading edge of the vertical flyback pulse at 234 when the field or frame is completed. Shifts in the high voltage will coincide with a changing scene, or changing text, and therefore will occur at a time when these changes can be most easily accomodated by the viewer.

In FIG. 6, an arrangement is shown for controlling the left margin of the display. The principle of operation is similar to that of FIG. 5. Counter 300 is incremented by clock pulses 302. The count is started at the end of the retrace (flyback) pulse at 304 or by a selected portion of the horizontal sync signal. The count is stopped by the pulse from index strip 204. The stop pulse also enables comparator 306. A reference count 308 is used to set the left margin. A reset pulse is derived from index strip 206, or other strips subsequent to 204. If the reading from counter 300 is higher than the reference count set at 308 then too many clock pulses have been received. The left margin is too wide. To correct this situation, direct current supply 310 is programmed to pass current 312 through deflection yoke 314 to shift the picture to the right. Conversely, if the reading from counter 300 is too low when comparator 306 is enabled, then the output current 312 of power supply 310 is reversed to shift the picture to the left.

DESCRIPTION OF ALTERNATE EMBODIMENTS

In FIG. 5, vertical size control was achieved by having power supply 224 vary its output voltage in consonance with power supply 216. If the width of the picture was increased so was its height. In FIG. 7 independent control of the height of the picture is provided.

Index strips such as 400, 402, and 404 are positioned at the top of the target screen 200. Index strips such as 406, 408, and 410 are positioned at the bottom of the screen. Clock signals 412 are fed into counter 414. A reference count is inserted at 415, reset is at 416, and the compare instruction at 418 enables comparator 420. If the count is high, then too much time has elapsed in the vertical scan and power supply 422 is programmed to increase its output voltage. This expands the vertical size of the picture by increasing the drive of deflection means 424. It is thus seen that the operation of FIG. 7 is analagous to the operation of the horizontal width control of the picture as per FIG. 5. Reset 416 is via the vertical flyback pulse whereas in FIG. 5 reset at 215 is via the horizontal flyback pulse.

The top-index means 400, 402, 404 provide the start signals for counter 414 and bottom-index means 406, 408, 410 provide the stop signals. The conventional scanning action of the electron beam is substantially parallel to strips 400 and 402 whereas it is substantially perpendicular to strips 404, akin to the scanning action of strips 204 and 206 in FIGS. 5 and 6. Accordingly, decoding means 430 and 432 are provided to furnish the start and stop signals that operate counter 414. The simplest decoder arrangement comprises circuitry responsive to the long duration of the index signals that are obtained from 400, 402, and 406, 408. A decoder with a low pass filter will separate the fast pulses (emitted by index strips such as 204 and 206) from the long pulses (emitted by index strips 400 and 402). The index signals from strips 404 and 410 can be decoded by the absence of preceding and succeeding pulses. A like scheme of missing pulse decoding logic can be used for the last strip 206 of FIGS. 5 and 6. Alternatively, index strip 207 can be added to the target screen. Decoding can also be accomplished by using individual electron beam-sensitive optical fibers in accordance with applicant's prior teachings in U.S. Pat. No. 3,826,867.

Returning to FIG. 1, variable gain element 62 is shown between blue video signals (or B-Y) at input 26 and the luminance signal at input 42. Element 62 is operative when a low-intensity saturated blue field is being received for display. Under these conditions the luminance signal is small. A portion of the blue video therefore is added to the luminance signal to assist in the generation and detection of the index signals. One way for achieving these results is to connect diode 64 and resistor 66 as shown in FIG. 1.

Figure 4:
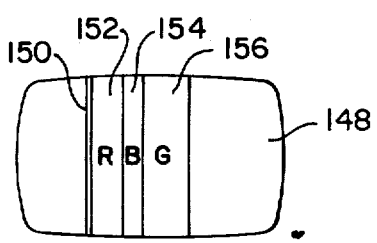
FIG. 4 is a greatly expanded view of one triad of a strip-like target screen in which the blue-emitting strip is the most narrow and the green-emitting strip is the most wide of the color-emitting strips.

Another feature that improves the image to be viewed is depicted in FIG. 4 Index signal generating strip 150 is followed by red-emitting strip 152, blue-emitting strip 154, and green-emitting strip 156 on target screen 148, akin to 200 of FIG. 5. Recommended horizontal dimensions for a 5 inch diagnal display are 8 mils, 7 mils, 9 mils for the red, blue, and green-emitting strips, respectively. The recommended width of the index strips 150 is 2 mils. These index strips preferably are interspersed between the green strips 156 and the red strips 152, or they can overlap the adjacent edges of 156 and 152. By making the width of the blue strip the most narrow, the line structure of the target screen is made to appear less pronounced. As a consequence of either of these configurations the pitch of a triad is approximately 24 mils, and the resulting screen efficiency is over 90%.

Two other configurations of the index strips on the target screen are possible which make the screen even more efficient. First, the index strip 150 need not be continuous in the vertical direction. The strip can be made of 2 mil squares separated by 1 mil spaces for example. Secondly, the index strip 150 need not be repeated once for every sequence of red, blue, and green-emitting strips. Thus, index strip 150 can be repeated for every six color-emitting strips. In the extreme, only 2 index strips need be used; one at the left margin and one at the right margin as depicted in FIGS. 5 and 6. This configuration requires a horizontal sweep with linear, or constant, characteristics such as can be provided by the width control features previously disclosed in this specification.

In the beam-index configurations just described the losses at the target screen are less than 10% of the available electron beam energy, and by using only 2 index strips the loss approaches zero. In marked contrast, it is to be noted that the equivalent target screen losses of the conventional shadow-mask color CRT is in the neighborhood of 70%.

Many different and conventional circuit designs exist and many components are commercially available for providing the above described circuit functions. Oscillators or clocks, counters, comparators, missing pulse detectors, decoders, integrators, video amplifiers, and programmable power supplies are all available in either discrete component form, in integrated circuits, or in hybrid form. The disclosures in U.S. Pat. Nos. 3,564,121 and 3,826,867 and 3,967,315 provide details on index signal generation and detection, and on target screen construction. The disclosures in these patents are incorporated herein by reference. Accordingly, further circuit and construction details are deemed not necessary for a proper understanding of this invention and have not been included in the drawing nor in the foregoing specification.

Having thus described my invention, I claim:

1. In a display apparatus comprising a target screen, means for developing a beam of energy, deflection means for deflecting the beam of energy across the target screen, and means for modulating the beam of energy; the improvement comprising: first index means associated with said target screen for providing first index signals indicative of a first position of said beam on said target screen, and second index means associated with said target screen for providing second index signals indicative of a second position of said beam on said target screen, timing means for measuring the time taken by the beam of energy to traverse the path from said first position to said second position, and control means responsive to said timing means for controlling said deflection means.

2. A display apparatus in accordance with claim 1 wherein: said beam of energy is a beam of light; wherein said first and second index means are excitable by said beam of light thereby to provide said first and second index signals; and wherein the control means are operative on said deflection means to keep substantially constant the time it takes for the light beam to go from said first position to said second position.

3. A display apparatus in accordance with claim 1 wherein said beam of energy is an electron beam; including switchable high voltage means for accelerating said electron beam to excite the target screen and means for switching the high voltage to generate a picture in different colors; and wherein the control means are operative on said deflection means to maintain said picture constant in size.

4. In a beam-index color display apparatus comprising a target screen with a repeating array of different color-emitting strips, a scannable beam of energy, means for scanning in a raster pattern said beam across said screen, index signal generating means in register with said strips for indicating the position of said scannable beam on said target screen, means responsive to said index signals for providing index pulses, and means responsive to said index pulses for modulating said beam; the improvement for controlling the geometry of said raster pattern comprising: means for generating a first index pulse and a second index pulse, separated in time, representative of two positions of the scanning beam on the target screen; and means, responsive to the difference in time between the first and second index pulses, for controlling the means for scanning said beam of energy.

5. An apparatus in accordance with claim 4 including means for deriving a third pulse synchronized with the raster scanning of the beam, and means responsive to the difference in time between said third pulse and one of said index pulses for shifting the position of the raster pattern on the target screen.

6. A display apparatus in accordance with claim 4 wherein said repeating array of different color-emitting strips comprise red, blue, and green-emitting strips, and wherein the blue-emitting strip is more narrow than the other color-emitting strips.

7. A display apparatus in accordance with claim 4 wherein said repeating array comprises red, blue, and green-emitting strips and wherein the means for modulating the beam of energy includes means responsive to incoming signals representative of the luminance component and representative of the red, blue, and green components of the picture to be generated; and means for adding to the luminance component a signal representative of the blue component when said incoming signals represent a low brightness blue area in the picture.

8. In a raster-scan display apparatus comprising a target screen, means for developing a scannable beam of energy, deflection means for deflecting the beam in a raster scan across the target screen, and means for modulating the beam of energy, thereby to produce a picture from a sequence of scanning lines; the improvement comprising; reference means for deriving reference signals related to flyback pulses associated with the raster scan; index means associated with said target screen for providing index pulses when the scanning beam is at a selected position on the target screen; timing means for measuring the interval between said reference signals and said index pulses; and control means, responsive to said timing means, operative on said deflection means for shifting the location of the picture on the target screen.

9. In a display apparatus comprising a target screen, means for developing a scannable electron beam, deflection means for scanning the electron beam across the target screen, means for modulating the electron beam, and high voltage means to accelerate the electron beam to the target screen; the improvement comprising: integrating means, repetitively operative over a substantially fixed time interval, responsive to said means for modulating the electron beam; and means responsive to said integrating means for automatically adjusting the output voltage of said high voltage means when the picture content changes.

10. An apparatus in accordance with claim 9 wherein said deflection means generate a raster scanning action with many lines per picture frame; including means responsive to the frame flyback sequence for starting and stopping said integrating means, whereby said high voltage means are adjusted on a frame-by-frame basis.

11. An energy-efficient beam-index color television display apparatus comprising: a target screen with an array of color-emitting strips in register with at least two index signal-generating strips; means for developing a scannable beam of energy; deflection means for scanning in raster format the beam of energy across the target screen; modulating means responsive to the index signals, and to incoming signals representative to the picture to be generated, for modulating the beam of energy; and power supply means, responsive to the index signals, and operative on said deflection means, for controlling the location on the target screen of at least one side of the picture.

12. An apparatus in accordance with claim 11 wherein said power supply means provides one output voltage for controlling the length of the scanning lines, and another output voltage for controlling the spacing between scanning lines, thereby to control the size of the picture.

13. An apparatus in accordance with claim 11 wherein said scannable beam of energy is an electron beam; including high voltage means to accelerate said electron beam to the target screen; integrating means responsive to said modulating means; and means responsive to said integrating means for automatically controlling the output of said high voltage means as a function of picture content, thereby to reduce the amount of energy needed to produce the picture.

14. An apparatus in accordance with claim 11, wherein said array of color-emitting strips comprises red, blue, and green-emitting strips and wherein the blue strips are more narrow than the red and green strips, thereby to decrease the apparent visible line structure in the picture.

15. The method of controlling the size of the picture on a target screen, of a raster scan type of display apparatus comprising the steps of:
 (1) generating a scannable beam of energy,
 (2) scanning said beam across a target screen in raster format,
 (3) generating a first index signal indicative of the position on the target screen of the scanning beam,
 (4) generating a second index signal indicative of a different position on the target screen of the scanning beam,
 (5) evaluating the time difference between said first and second index signals, and
 (6) controlling the scanning of said beam in consequence of the evaluation performed in step 5.

16. The method of controlling the position of the picture developed by the deflection of a scanning beam in a raster scan display apparatus comprising the steps of:
 (1) generating a timing pulse which is synchronized with the start of a raster scanning line, and
 (2) generating an index signal indicative of the position on the target screen of the scanning beam, and
 (3) evaluating the elapsed time between said timing pulse and said index signal, and
 (4) controlling the starting position of the scanning beam as a consequence of the evaluation performed in step 3.

17. The method of controlling the size of a picture developed on a target screen in the presence of a switchable accelerating voltage, characteristic of the beam-penetration kinescope, comprising the steps of:
 (1) generating and deflecting a scannable electron beam in order to excite said target screen,
 (2) scanning said beam in a raster line across said target screen,
 (3) generating a first index pulse indicative of a first position of the electron beam on the raster line,
 (4) generating a second index pulse indicative of a second position of the electron beam on the raster line,
 (5) comparing the time interval between said first and second index pulses to a reference time interval, and
 (6) controlling the length of said raster line as a consequence of the results of the comparison in step 5.

18. A full-color line screen image display apparatus comprising a viewable screen having a repeating array of red, blue, and green color-producing lines which create a full color image; characterized by the features that
 (1) the red line is not of greater width than the green line, and
 (2) the blue line is of lesser width than one-half the sum of the width of the red line and the width of the green line, and is substantially more wide than one-third of the width of the green line.

19. An energy-efficient beam-index color television display apparatus comprising a target screen in accordance with claim 18 in combination with: means for developing a scannable electron beam; deflection means for scanning the electron beam across the target screen in a raster format; means for modulating said electron beam to generate a picture; high voltage means to accelerate said electron beam to the target screen; integrating means responsive to said means for modulating the electron beam; and means responsive to said integrating means for automatically controlling the output voltage of said high voltage means, thereby to reduce the amount of energy needed to produce the picture.

20. A beam-index color display apparatus comprising the target screen of claim 18; means for generating a scannable beam of energy; means for raster scanning said beam across the target screen; means for receiving incoming signals containing a luminance component and red, blue, and green color components representative of the picture to be generated; modulating means responsive to said incoming signals, and to said index signals, for modulating the beam of energy; including means in said modulating means for adding a blue component to the luminance component, said last means becoming inoperative when the luminance component exceeds a threshold value.

21. A beam-index display apparatus in accordance with claim 18 wherein said viewable screen comprises a first index strip positioned at one side of said repeating array of color-producing lines and a second index strip positioned at the other side of said array, and including means responsive to signals derived from said index strips for controlling the size of the image on said viewable screen.

22. A beam-index display apparatus in accordance with claim 18 wherein said viewable screen comprises a plurality of index strips in register with and dispersed within said repeating array of red, blue, and green color-producing lines, and wherein the width of said index strips is not substantially greater that 0.002 inches.

23. A beam-index display apparatus in accordance with claim 22 wherein said index strips are disposed adjacent to the region where the red and green color-producing lines are closest to each other.

24. A beam-index display apparatus in accordance with claim 18 wherein said viewable screen comprises a plurality of index strips in register with and dispersed within said repeating array of red, blue, and green color-producing lines, and wherein said index strips are disposed adjacent to the region where the red and green lines are closest to each other.

* * * * *